F. A. COLLINS, Jr.
BALL BEARING.
APPLICATION FILED JUNE 11, 1915.
1,219,919.
Patented Mar. 20, 1917.
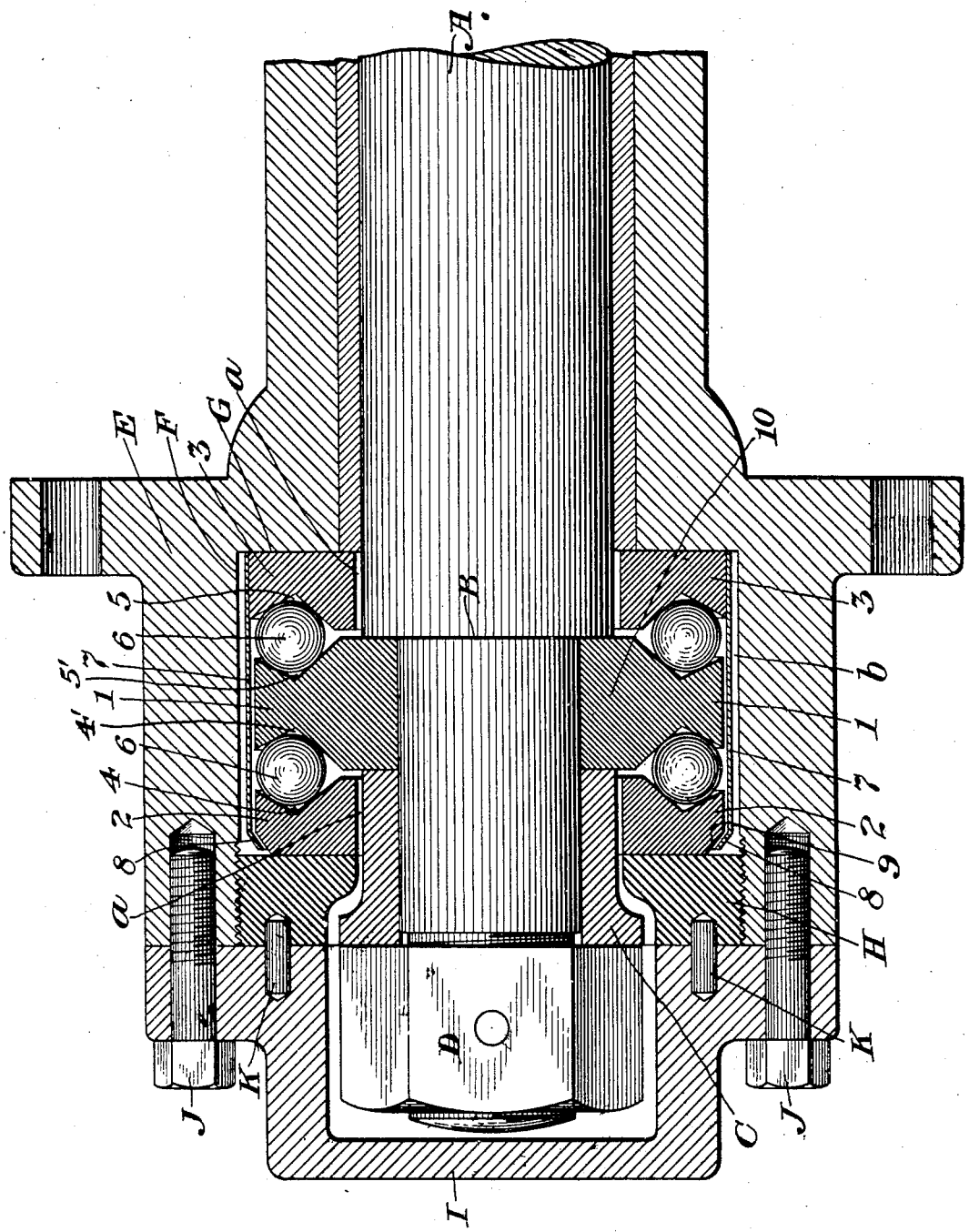
WITNESS
Chas. J. Clagett
INVENTOR
F. A. Collins, Jr.
BY
Chas. F. Dane
ATTORNEY

UNITED STATES PATENT OFFICE.

FRANCIS A. COLLINS, JR., OF ROCHESTER, NEW YORK, ASSIGNOR TO AUBURN BALL BEARING COMPANY, OF ROCHESTER, NEW YORK, A CORPORATION OF NEW YORK.

BALL-BEARING.

1,219,919.  Specification of Letters Patent.  Patented Mar. 20, 1917.

Application filed June 11, 1915. Serial No. 33,452.

*To all whom it may concern:*

Be it known that I, FRANCIS A. COLLINS, Jr., a citizen of the United States, and resident of Rochester, in the county of Monroe and State of New York, have invented certain new and useful Improvements in Ball-Bearings, of which the following is a specification.

This invention relates to ball bearings, and particularly to thrust bearings designed to receive end thrusts of a rotary shaft in either direction.

The object of the invention is to provide a triple-race member ball bearing which is self-contained, readily positioned, and highly efficient in its operation.

With this object in view, the invention consists in providing an intermediate race member and an end race member disposed at either side of the intermediate race member, the usual anti-friction balls being positioned between the adjacent faces of the intermediate race member and each of the extreme or end race members. The three race members so positioned are held together in a unit by means of an external sheet-metal sleeve, and the three race members can, therefore, be handled as a unit and readily positioned. The intermediate race member projects radially toward the axis of the bearing a greater distance than the extreme or end race members to provide a hub portion capable of being secured to the rotary shaft, in combination with which the bearing is used.

The invention is illustrated in the accompanying drawing, which illustrates the improved ball bearing applied to a rotary shaft and inclosed by a housing.

The intermediate race member above referred to is indicated at 1, and the extreme or end race members are indicated at 2 and 3, respectively. As will be seen from the drawing, these three race members are made annular in shape and are juxtaposed so that the extreme or end race members 2 and 3 will lie laterally adjacent the intermediate race member 1.

The end race members 2 and 3 are provided with grooved raceways 4 and 5, respectively, and the intermediate race member 1 is provided, on its opposite faces, with corresponding grooved raceways 4' and 5', between which and the raceways 4 and 5, the usual anti-friction balls 6 are positioned.

The exact shape of the raceway grooves is immaterial to the present invention, but as shown in the drawing, they are made substantially V-shaped in cross section. Furthermore, it is immaterial, so far as the present invention is concerned, whether or not a cage or holder is provided for the anti-friction balls. In the present instance, no such cage or holder is employed.

The three race members 1, 2 and 3, with the intermediate anti-friction balls 6, are held together as a unit by means of an external sheet-metal sleeve 7, which is tightly fitted to the race member 3, or otherwise rigidly secured thereto. At its other end, the external sleeve 7 is crimped or bent inwardly, as indicated at 8, over a beveled edge portion 9 of the race member 2. The sleeve 7, however, fits loosely over the race members 1 and 2, and both of the same are free to turn within the sleeve.

The central or intermediate race member 1 projects radially toward the axis of the bearing a greater distance than the extreme or end race members 2 and 3 to provide a hub portion 10 capable of being secured to a rotary shaft.

When the bearing is applied to its shaft, the hub portion 10 of the intermediate race member may be secured to the shaft in any suitable manner, by keying the same thereto, or by clamping the hub portion 10 against a suitably formed shoulder on the shaft. The latter means is resorted to, in the present instance, and for this purpose, the rotary shaft A, in combination with which the bearing is used, is provided with a shoulder B, against which the hub portion 10 of the intermediate race member is clamped by means of a clamping sleeve C. The clamping sleeve C is made to perform its function of clamping the intermediate race member in place by means of a nut D having threaded engagement with the extremity of the shaft, as will be clear from an inspection of the drawing. By this means, it will be seen that the intermediate race member 1 is clamped rigidly to the shaft and rotates therewith. The end thrusts of the shaft are, therefore, transmitted through the intermediary of the intermediate race member 1 to the extreme or end race members 2 and 3, which latter are rigidly held against axial movement, i. e., movement in a direction parallel to the end thrusts of the shaft, by a suitable housing, indicated at E. The whole bearing is accommodated in a recess F of the housing, and the end race member 3 abuts against a shoulder G of the housing, while the end race member 2 is held against lateral movement by means of a circular nut or washer H screwed into the interior of the housing E into contacting relation with the race member 2. The end of the housing E is closed by means of a cap I bolted to the housing by means of the bolts J. The nut or washer H may be locked in place by means of the dowel pins K inserted in recesses which lie partly in the washer H and partly in the cap I.

When the ball bearing is positioned, sufficient room should be left in the housing for slight radial movements of the bearing to compensate for wear in the shaft bearings. This is provided for by the clearance $a$ left between the central opening of the end race members 2 and 3, and the parts of the shaft which they surround, and the clearance shown at $b$ between the external sleeve 7 and the adjacent inner cylindrical wall of the housing E. Due to the provision of these clearances, it is obvious that radial movement of the shaft A, due to wear of the bearings, will produce slight radial movements of the race members 2 and 3, so that the latter will accommodate themselves to the position of the shaft and no binding action will take place on the anti-friction balls. The intermediate race member 1 properly cares for the radial weight of the balls 6, end race members 2 and 3 and external sleeve 7, and serves to center these parts as just stated, when the shaft A changes its position.

From the foregoing description, it will be seen that the intermediate race member 1 rotates unitarily with the shaft A and serves to transmit the end thrusts of the shaft to the end race members 2 and 3 through the intermediary of the anti-friction balls 6. The end race members 2 and 3 are supposed to remain stationary and may be positively held stationary, if so desired, by means of dowel pins or by set screws.

The outer sleeve 7 serves to bind the three race members together, so that the same may be handled and positioned as a unit and also serves to protect the bearing from foreign matter, such as dust, dirt and the like. If so desired, the external sleeve 7 may be provided with openings adjacent the anti-friction balls 6 to permit lubrication of the latter.

Obviously the bearing may be secured to the shaft and associated with the housing in other ways than that herein shown and described, those shown being merely exemplary and illustrated merely for the purpose of showing one means of securing the radially projecting hub portion 10 of the intermediate race member to the rotary shaft. Furthermore, various changes and modifications may be made in the structure of the bearing itself, without departing from the spirit or scope of the invention as defined in the accompanying claims.

What I claim is:—

1. An end thrust ball bearing for rotary shafts, comprising an intermediate annular race member, an annular end race member disposed at either side thereof, anti-friction balls between said race members, and an external sheet-metal sleeve serving to bind the three race members together to make a unit of the same, the intermediate race member projecting into closer proximity with the axis of the bearing than the end race members to permit it to be secured to the shaft.

2. An end thrust ball bearing for rotary shafts, comprising an intermediate annular race member, an annular end race member disposed at either side thereof, anti-friction balls between said race members, and an external sheet-metal sleeve serving to bind the three race members together to make a unit of the same, the intermediate race member being designed to be secured at its hub portion to the rotatable shaft.

3. An end thrust ball bearing for rotary shafts, comprising an intermediate annular race member, an annular end race member disposed at either side thereof, anti-friction balls between said race members, and an external sleeve secured to one of the end race members and projecting over but loose from the other two race members, said sleeve serving to bind the three race members together into a unit, the intermediate race member being adapted to be secured at its hub-portion to the rotary shaft.

Signed at Rochester, in the county of Monroe and State of New York, this 8th day of June, A. D. 1915.

FRANCIS A. COLLINS, Jr.

Witnesses:
Thos. D. Patton,
Robt. J. Garrison.